(12) United States Patent
Hubbard (10) Patent No.: US 11,045,832 B1
(45) Date of Patent: Jun. 29, 2021

(54) COATING METHOD FOR COMPRESSED BIOMASS PRODUCTS

(71) Applicant: Sherman M. Hubbard, Lincoln, MI (US)

(72) Inventor: Sherman M. Hubbard, Lincoln, MI (US)

( * ) Notice: Subject to any disclaimer, the term of this patent is extended or adjusted under 35 U.S.C. 154(b) by 372 days.

(21) Appl. No.: 16/176,049

(22) Filed: Oct. 31, 2018

Related U.S. Application Data (60) Provisional application No. 62/581,084, filed on Nov. 3, 2017.

(51) Int. Cl.
| | |
|---|---|
| *B05D 1/18* | (2006.01) |
| *B05D 7/06* | (2006.01) |
| *B05C 3/00* | (2006.01) |
| *B05C 3/10* | (2006.01) |
| *B05D 7/24* | (2006.01) |

(52) U.S. Cl.
CPC ............ *B05D 1/18* (2013.01); *B05C 3/005* (2013.01); *B05C 3/10* (2013.01); *B05D 7/06* (2013.01); *B05D 7/24* (2013.01)

(58) Field of Classification Search
None
See application file for complete search history.

(56) References Cited

U.S. PATENT DOCUMENTS

| | | | |
|---|---|---|---|
| 2005/0246946 A1* | 11/2005 | Paplinski ............... | C10L 11/04 44/544 |
| 2008/0134572 A1* | 6/2008 | Cui .......................... | C10L 5/361 44/542 |
| 2009/0233746 A1* | 9/2009 | Leighton ................. | B65G 15/38 474/268 |
| 2016/0047551 A1* | 2/2016 | Stewart ................... | F23B 80/04 110/229 |
| 2017/0021383 A1* | 1/2017 | Takai ....................... | G02B 5/02 |
| 2017/0081607 A1* | 3/2017 | Schunk .................... | C10L 11/06 |

* cited by examiner

*Primary Examiner* — Shamim Ahmed
*Assistant Examiner* — Bradford M Gates
(74) *Attorney, Agent, or Firm* — Neustel Law Offices (57) ABSTRACT

A coating method for compressed biomass products for providing the products with a substantially monolithic, water resistant coating to facilitate improved storage characteristics. The coating Method for compressed biomass products generally includes conveying the products into a tank or spray of heated, liquified coating material that then cools and hardens to provide a uniform, monolithic coating on the entire outer surface of the products.

20 Claims, 9 Drawing Sheets

COATING METHOD FOR COMPRESSED BIOMASS PRODUCTS

CROSS REFERENCE TO RELATED APPLICATIONS

I hereby claim benefit under Title 35, United States Code, Section 119(e) of U.S. provisional patent application Ser. No. 62/581,084 filed Nov. 3, 2017. The 62/581,084 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a coating method for compressed biomass products for improving storage, shipping, burn qualities, etc.

Related Art

Any discussion of the related art throughout the specification should in no way be considered as an admission that such related art is widely known or forms part of common general knowledge in the field.

Compressed biomass products, such as compressed sawdust bricks and logs for burning in fireplaces, fire pits, etc., have been in use for years. However, such products are highly susceptible to degradation from moisture, and may also harbor undesirable organisms that may then be transported to other states or areas when the product is shipped or transported by an end user.

SUMMARY

An example embodiment is directed to a coating method for compressed biomass products. The compressed biomass products may be, for example, compressed sawdust bricks or logs, useful for burning for heat or cooking, generally in fireplaces or to build free-standing fires. Typically, however, such compressed biomass products in the past have not been weatherproof or waterproof, or even water resistant. For example, an untreated compressed biomass product brick made of compressed sawdust will disintegrate in about a minute and a half under a water spray.

The coating method for compressed biomass products includes conveying the products on a conveyor or other system and applying heated, liquid coating material to the products. In an example embodiment, the coating method may uniformly coat the outside surface of the compressed biomass products with the coating material, which may be a wax or other material with waterproof or water-resistant qualities.

An example process may include heating a coating material in a tank to a temperature above its melting point, so that it is in a liquid state, the coating material having a depth and a surface. To continue, a conveyor is provided for moving the compressed biomass products into the tank, the conveyor having a first end, a second end, and a central portion, and a conveyor surface, the first end and the second end of the conveyor being beyond the liquid surface. The central portion of the conveyor is in the coating material and the conveyor surface of the central portion is lower than the liquid surface by a distance greater than a thickness of the compressed biomass product.

The example process also involves activating the conveyor so that the conveyor surface moves in a direction from the first end toward the second end. It also involves placing the compressed biomass products onto the conveyor proximate the first end. Thus, the compressed biomass products are conveyed into the coating material proximate the central portion of the conveyor so that they are substantially immersed in the coating material. Then, the compressed biomass products may be conveyed out of the coating material proximate the second end of the conveyor.

In another example embodiment, the coating material used in the process may comprise a wax, which in turn may comprise paraffin wax.

In another example embodiment, the melting point of the wax may be greater than about 130 degrees F.

In another example embodiment, the wax or coating material may be heated to a controlled temperature above about 190 degrees F.

In another example embodiment, the wax or coating material may be heated to a controlled temperature above about 215 degrees F.

In another example embodiment, the compressed biomass product may be a log, while in yet another example embodiment, the compressed biomass product may be a brick.

In another example embodiment, the conveyor used may be a chain conveyor. Further, the conveyor may have a surface, which may in turn comprise spaced irregularities to prevent the compressed biomass products from slipping on the conveyor surface. For example, the spaced irregularities may be bends or kinks in the wires of a chain conveyor that rise above the surface of the conveyor.

There has thus been outlined, rather broadly, some of the embodiments of the coating method for compressed biomass products in order that the detailed description thereof may be better understood, and in order that the present contribution to the art may be better appreciated. There are additional embodiments of the coating method for compressed biomass products that will be described hereinafter and that will form the subject matter of the claims appended hereto. In this respect, before explaining at least one embodiment of the coating method for compressed biomass products in detail, it is to be understood that the coating Method for compressed biomass products is not limited in its application to the details of construction or to the arrangements of the components set forth in the following description or illustrated in the drawings. The coating Method for compressed biomass products is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example coating method for coating compressed biomass products 10 generally uses a tank 30 that holds a coating material 14, such as wax, that may be substantially solid at room temperature, yet have a melting point so that the tank 30 can hold the coating material 14 in a liquid state when heated. To heat the coating material 14 until it is a liquid, one or more heaters 40 can be used. The heaters 40 can be installed so that their heating elements 42 are in contact with the coating material 14 in the tank 30.

The tank 30 may be shaped so that a conveyor 20 can continuously convey any number of compressed biomass products from a first end of the conveyor 20, beyond the liquid coating material 14, then into the coating material (so that each compressed biomass product 10 is submerged entirely in the coating material 14 as it traverses the tank 30). After being submerged, the compressed biomass product 10 emerges from the liquid bath toward the second end of the conveyor 20, where it can be packaged or processed further for sale or storage.

The conveyor may have a first end, where compressed biomass products 10 are deposited, and a central portion that is positioned so that each compressed biomass product 10 is completely submerged near the center of the conveyor 20. The conveyor may also have a second end to carry and receive processed compressed biomass products out of the coating bath and away from the tank 30. Once packaged, the compressed biomass products 10 can be stored outside, since they will have a waterproof or water resistant coating.

B. Conveyor

As discussed, an example coating method for coating compressed biomass products 10 generally uses a tank 30 that holds a coating material 14, such as wax, that may be substantially solid at room temperature, yet have a melting point so that the tank 30 can hold the coating material 14 in its liquid state when heated. To achieve a high throughput to make the process efficient, a conveyor 20 may be used. As shown in FIGS. 1-4, the conveyor 20 may generally include a topmost surface 26, on which compressed biomass products rest. In an example embodiment, the conveyor 20 may be an endless chain conveyor, driven by a motorized chain.

A chain conveyor is a good choice for coating compressed biomass products because in the example embodiments, it allows liquid coating material 14 to coat the products on all sides, including the bottom. When the process is used, the compressed biomass products are coated evenly with coating material 14, such that no marks or indicators of the process are visible on the finished products.

Figure 1:
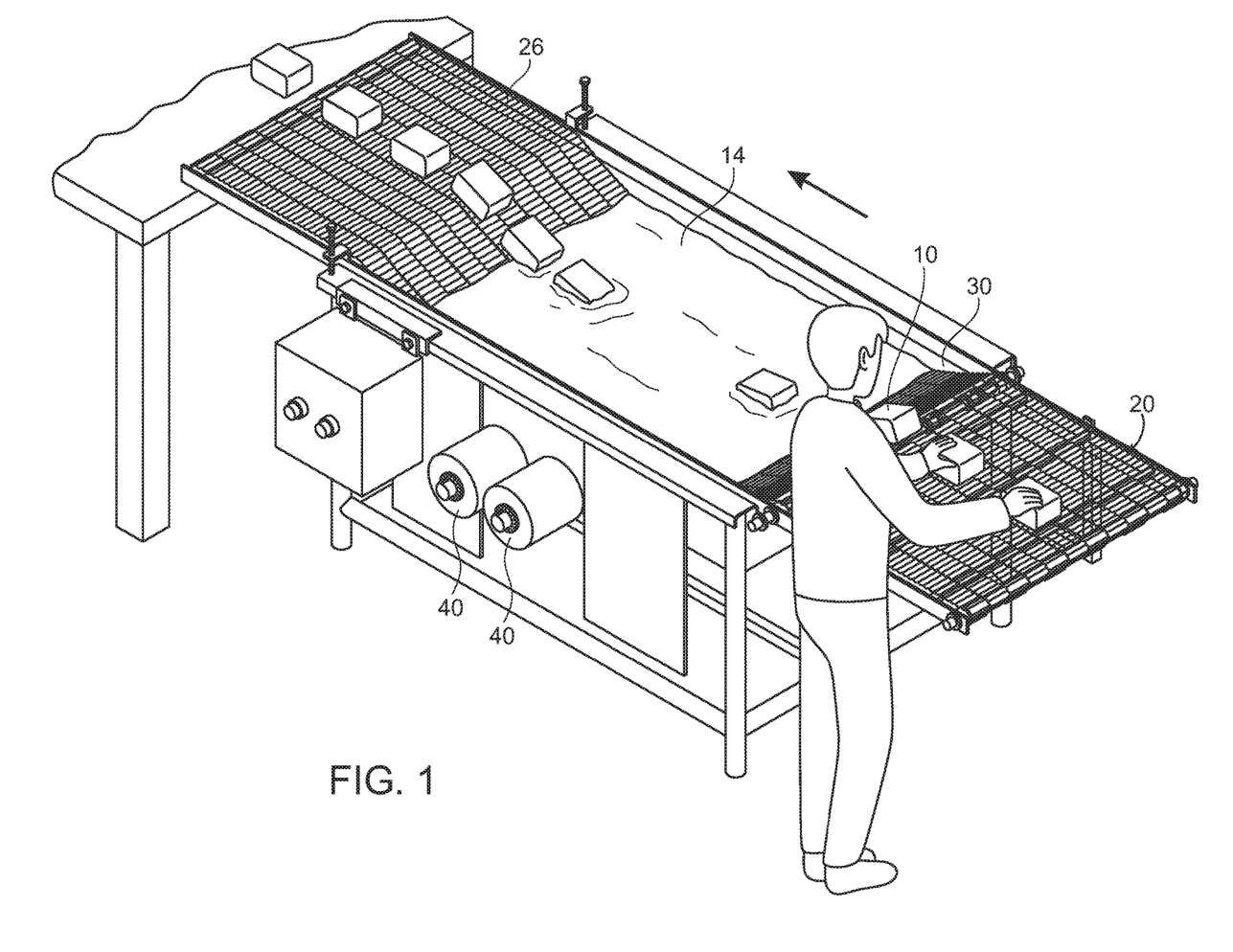
FIG. 1 is a perspective view of a coating method for compressed biomass products in accordance with an example embodiment.
Figure 2:
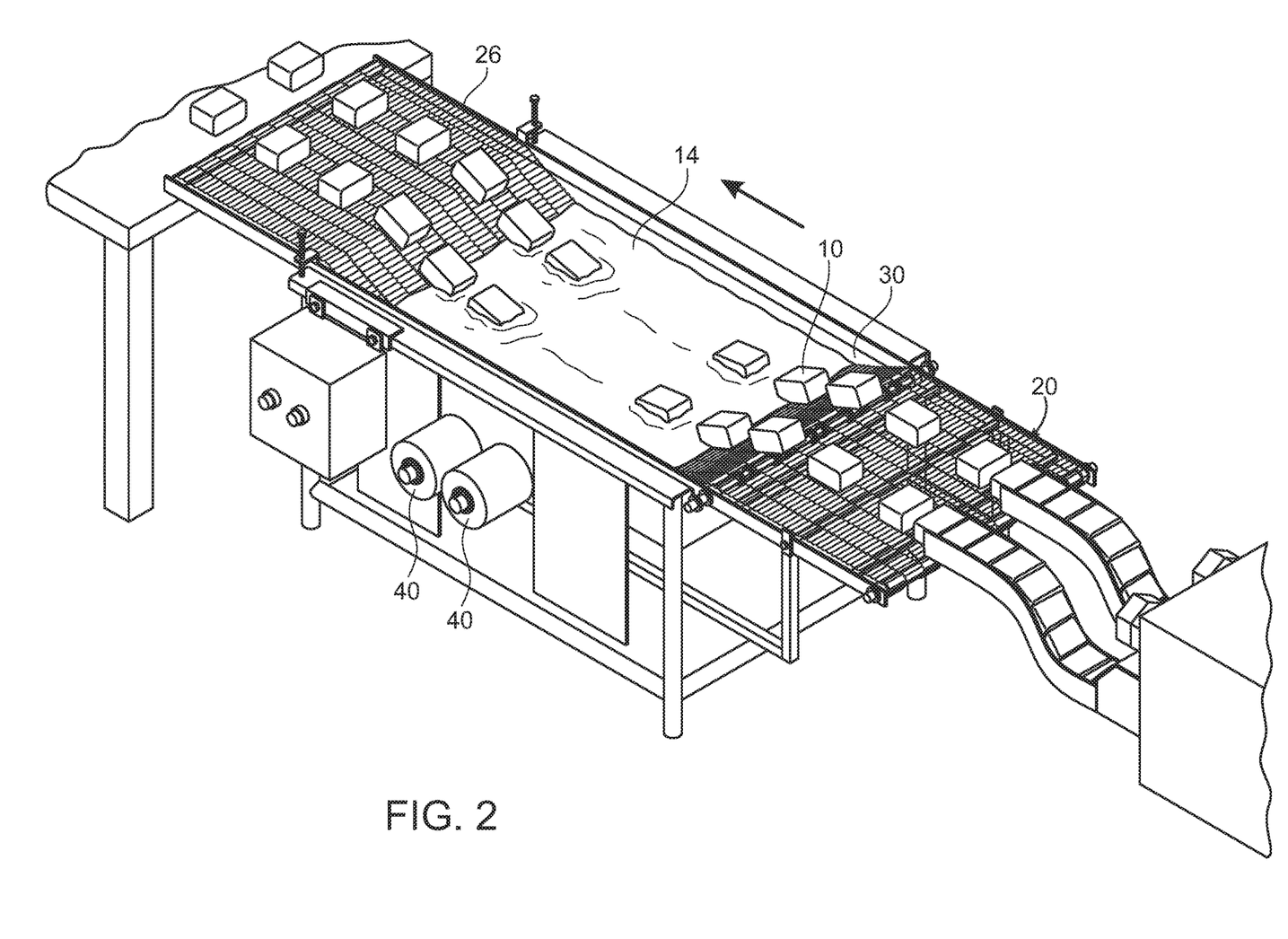
FIG. 2 is another perspective view of a coating method for compressed biomass products in accordance with an example embodiment.
Figure 3:
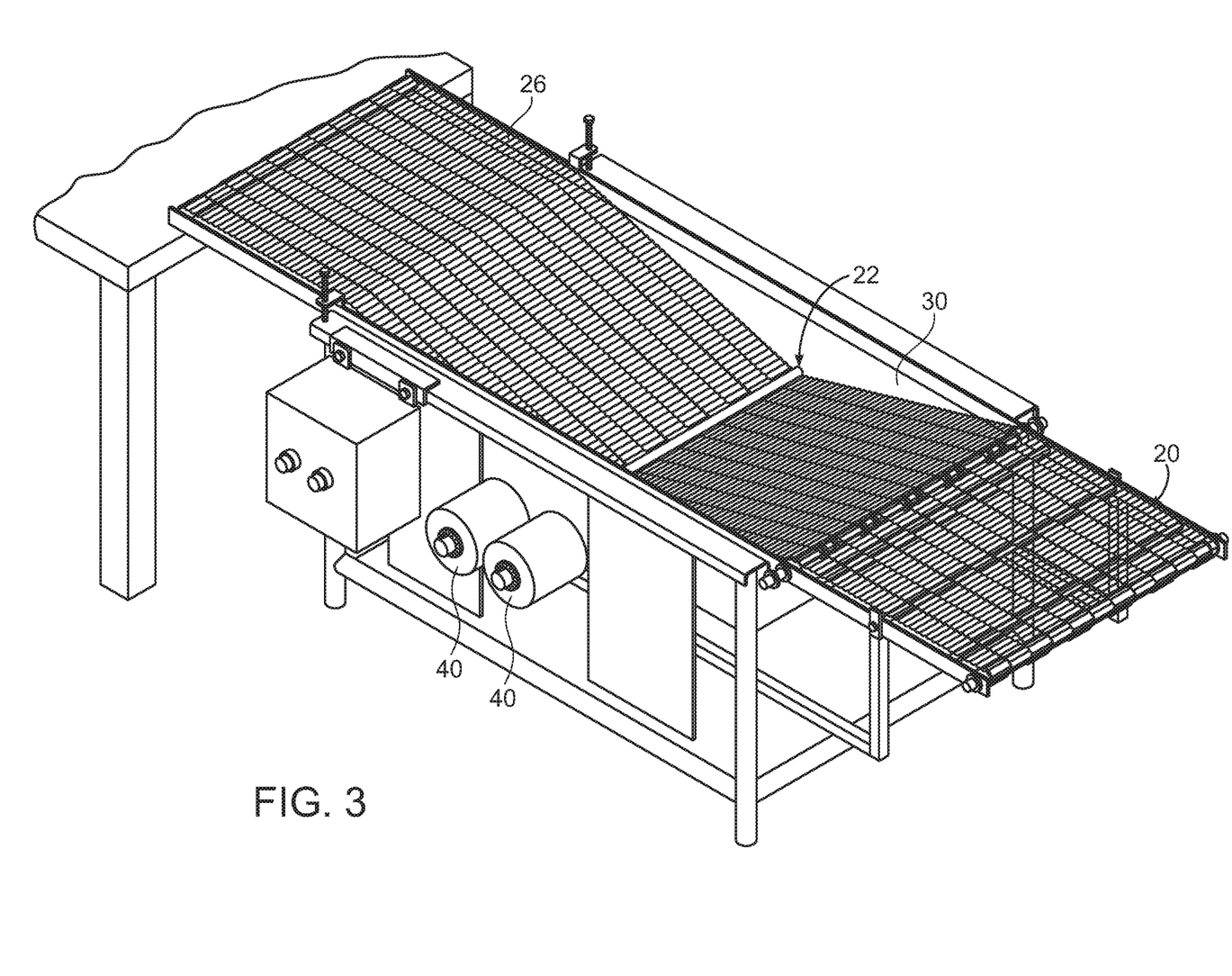
FIG. 3 is a perspective view of a system for use with a coating method for compressed biomass products in accordance with an example embodiment.

As shown in FIG. 3, which illustrates the conveyor 20 and tank 30 with no coating material, the conveyor has a first end toward the right side of the system in the figure. Compressed biomass products 10 are first loaded at this end of the conveyor, as shown in FIGS. 1 and 2. In the figures, the conveyor moves from this first end, into the tank, toward the second end, where products are collected as shown in FIGS. 1 and 2.

Figure 6:
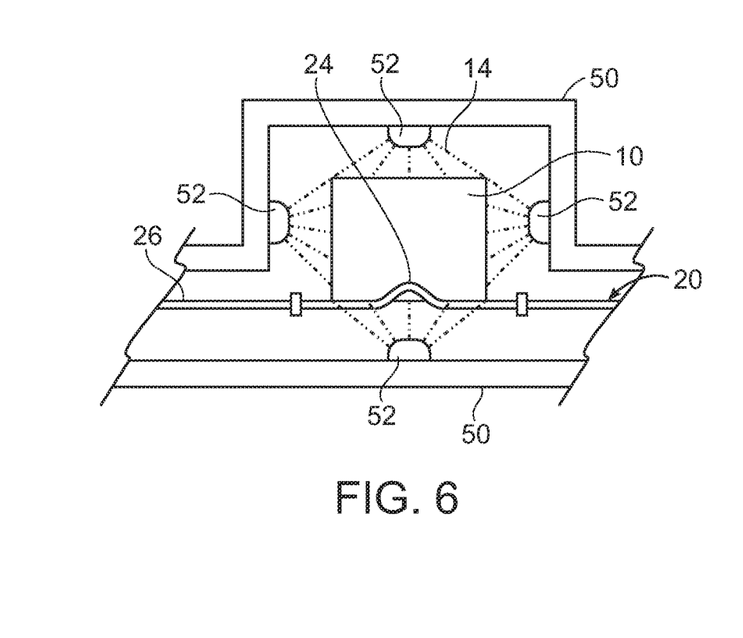
FIG. 6 is an end view of a compressed biomass product on a conveyor for use with a coating method for compressed biomass products in accordance with another example embodiment.

Due to the light weight of the compressed biomass product 10, and the lubricating, fluid, and buoyant qualities of the liquid coating material 14, an ordinary chain conveyor may allow the compressed biomass products being coated to slip backward upon exiting from the bath of the coating material 14, since in this region the conveyor has an uphill slope. To prevent this, the conveyor may be modified to add regular or randomly spaced irregularities 24 that rise above the surface 26 of the conveyor 20. These irregularities will engage the back edge or side of each compressed biomass product 10 to prevent them from slipping back into the liquid coating material 14 as they exit the bath. An end view of one such irregularity is shown in FIG. 6.

The irregularities may comprise bends or kinks in the wires of the chain conveyor 20, which normally run transverse to the direction and motion of the conveyor 20. The irregularities 24 may also comprise separate components clamped or affixed on the chain conveyor. Multiple types of embodiments of the irregularities 24 will work, so long as they perform the function of preventing backward motion of the conveyed products 10 as the conveyor pushes them.

The spacing of the irregularities 24 is not critical, but in an example embodiment, they may be spaced farther apart than the length of the conveyed products 10.

Figure 4:
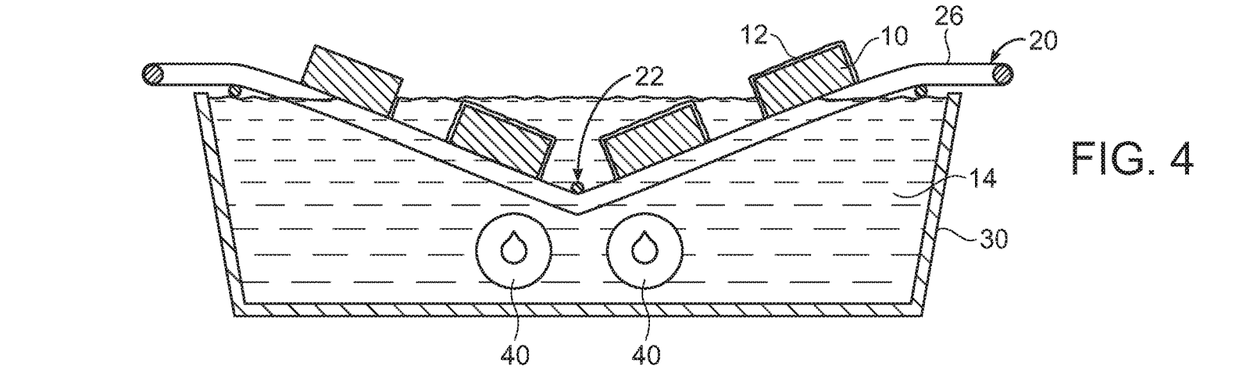
FIG. 4 is a sectional view of a system for use with a coating method for compressed biomass products in accordance with an example embodiment.
Figure 5:
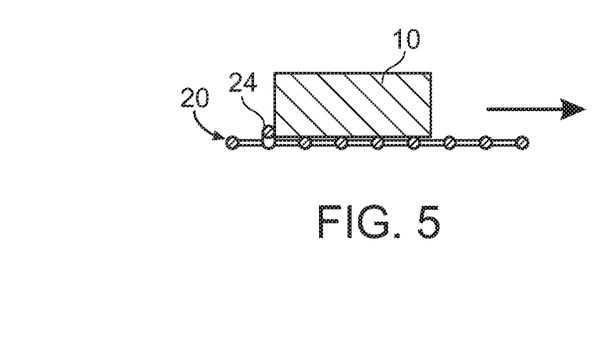
FIG. 5 is a side view of a compressed biomass product on a conveyor for use with a coating method for compressed biomass products in accordance with an example embodiment.

To ensure that the compressed biomass products are fully submerged as they are conveyed into the tank 30, it is necessary for the conveyor to have a slope into the tank, so that the upper surface 26 of the conveyor is below the surface of the liquid coating material 14 by a distance at least as great as the thickness of the compressed biomass product 10. This can be done by an idler roller 22 mounted to hold the conveyor down in or near the central portion of the conveyor as shown in FIG. 4. Through the use of the roller 22, tension can be maintained on the conveyor 20 as needed so that it continues to convey product from the first end toward the second end.

C. Tank

As best shown in FIGS. 1-4, an example embodiment of the system includes a tank 30 to hold the coating material 14, and to provide structure for the conveyor and its components. The tank 30 may have sloped sides, as shown in FIG. 4, to facilitate entry and exit of the conveyor 20. The tank also may include threaded holes (not shown) into which heaters 40 are installed. Typical screw plug sizes for heaters 40 are 1", 1¼", 2", and 2½". Heaters 40 may be screw plug immersion heaters, which typically have built-in thermocouples and temperature controls, for maintaining a set, controlled temperature of whatever liquid the heater elements 42 are immersed in.

Figure 7:
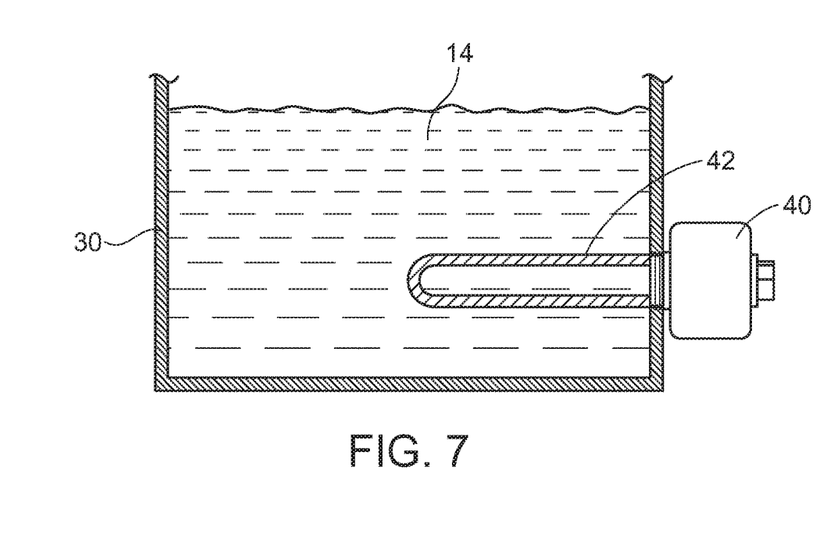
FIG. 7 is a sectional view of a tank and heater for use with a coating method for compressed biomass products in accordance with an example embodiment.
Figure 8:
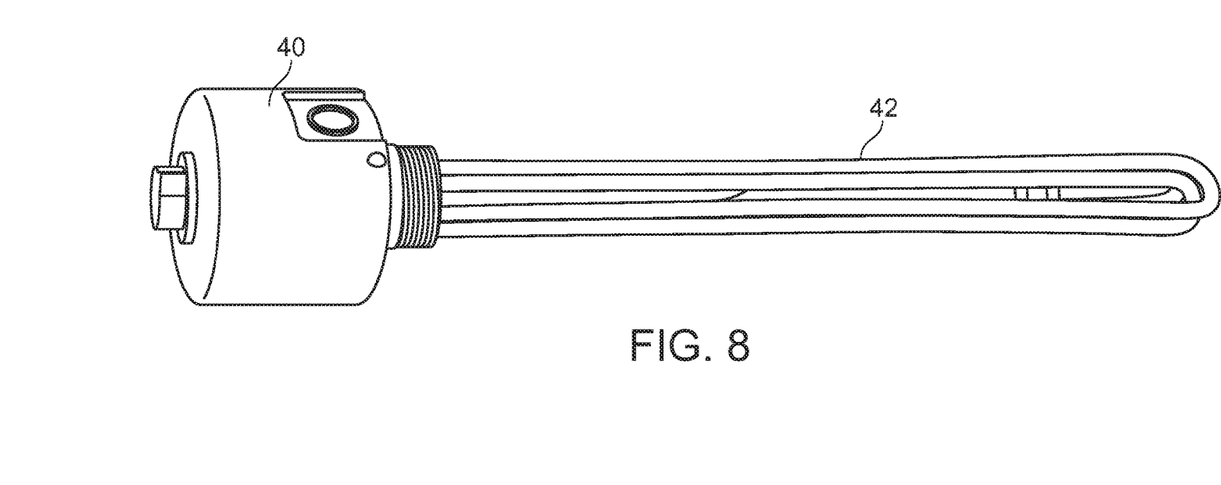
FIG. 8 is a sectional view of a heater for use with a coating method for compressed biomass products in accordance with an example embodiment.

FIG. 7 shows, in simplified form, tank 30, heater 40, and heater elements 42 submerged in the coating material 14. Typically, the conveyor 20 would be positioned to pass above the heater 40 shown here. FIG. 7 also shows how the heater 40, a screw plug type, may be threaded into the tank 30 to provide a secure, water-tight connection. As also shown, the heater 40 has a control knob for setting the temperature as needed.

In the embodiments shown, the heater elements 42 are submerged within the coating material 14, so that it may be heated to a known temperature. Although the system is shown with two heaters, more or fewer heaters may also be used, so that the heating element watt-density and initial heating time required can be adjusted for best performance.

Typically, a steel sheath for the heating elements is appropriate for heating wax and similar materials. Screw plug immersion heaters with a steel sheath may typically heat up to 750° F., which easily exceeds the temperatures needed for heating, for example, paraffin wax or similar materials used as coating material 14.

D. Operation of Preferred Embodiment

An example coating method for coating compressed biomass products 10 generally uses a tank 30 that holds a coating material 14, such as wax, that may be substantially solid at room temperature, yet have a melting point so that the tank 30 can hold the coating material 14 in a liquid state when heated. To heat the coating material 14 until it is a liquid, one or more heaters 40 can be used. The heaters 40 can be installed so that their heating elements 42 are in contact with the coating material 14 in the tank 30.

As shown in FIGS. 1 and 2, compressed biomass product 10 is placed or deposited on a first end of conveyor 20, which may be substantially level. FIG. 1 shows the procedure being done manually by a person, while FIG. 2 illustrates the compressed biomass products 10 exiting a manufacturing machine and being deposited directly onto conveyor 20. In either case, throughput of the system is high—it is possible to process 10,000 compressed biomass products per day with the system of an example embodiment.

Before products are placed on the conveyor 20, the coating material 14 is typically heated to a point above its melting point, so that it will be in liquid form. As an example of coatings that can be used, it is possible to use paraffin, beeswax, synthetic wax, or other coatings may be used. For example, a paraffin wax with a melting point of 140° F. may be used. A melting point of 140° F. is a workable choice because it will prevent the coating from melting in, for example, the trunk of a car in Arizona.

It may be desirable to heat the coating material 14 to a controlled temperature above the melting point. If, for example, a melting point of 140° F. is chosen, it may be desired to heat the coating material above 150° F., because if the temperature is too low, the coating may not properly penetrate and adhere to the surface of the compressed biomass product 10. For example, heating a 140° F. wax to only 150° F. may cause the coating to flake off once it hardens, rather than to remain on the base product.

Typically, temperatures for the coating material 14 may be above 190° F. to ensure good performance. In practice, controlling the coating bath temperature to approximately 220° F. has yielded good results.

Figure 13:
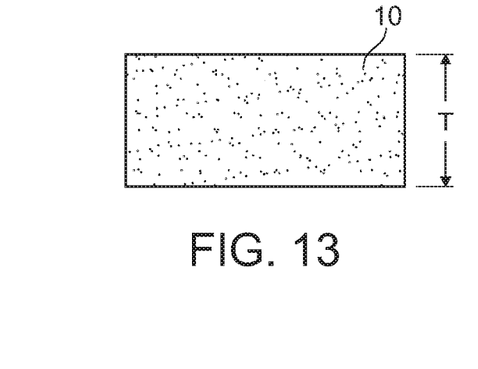
FIG. 13 is a side view of one shape of compressed biomass product for use with a coating method for compressed biomass products in accordance with an example embodiment.
Figure 14:
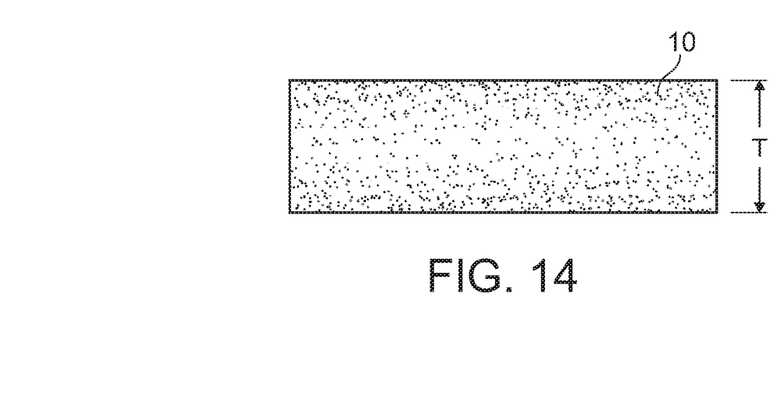
FIG. 14 is a side view of another shape of compressed biomass product for use with a coating method for compressed biomass products in accordance with an example embodiment.

FIG. 4 shows the process, where compressed biomass products 10 enter the tank on the left, and are immersed in the liquid coating material 14. About ten seconds in the coating bath is adequate and allows good throughput of the process. As also shown, the products 10 are immersed in a depth of coating material 14 greater than their thickness T (see FIGS. 13 and 14) so that the coating is evenly applied to the entire outside surface of each product. As discussed above, the compressed biomass product 10 can be a brick (FIG. 13) or a log (FIG. 14), although other shapes are possible as well.

Figure 11:
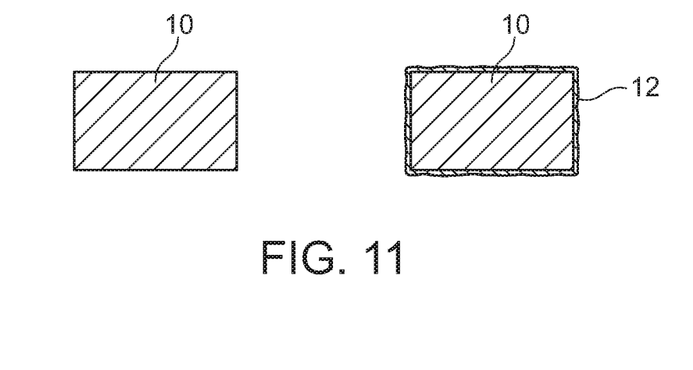
FIG. 11 is a sectional view of one shape of compressed biomass product for use with a coating method for compressed biomass products in accordance with an example embodiment.
Figure 12:
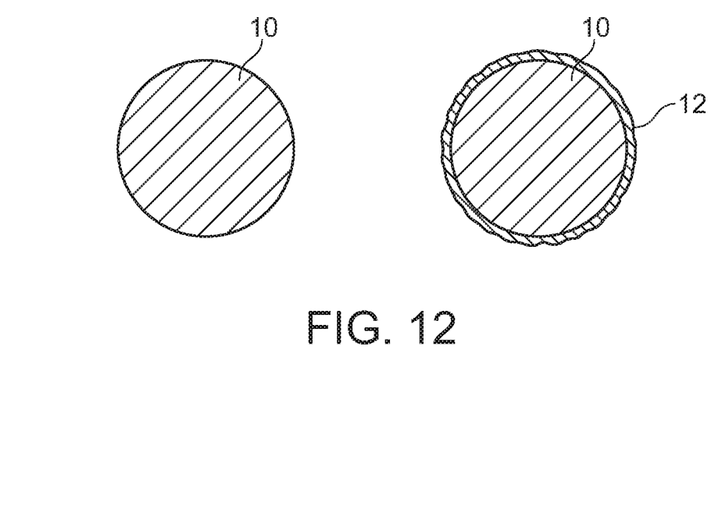
FIG. 12 is a sectional view of another shape of compressed biomass product for use with a coating method for compressed biomass products in accordance with an example embodiment.

Once hardened, the coating material 14 covers the outside surface of compressed biomass product 10, creating a monolithic structure, coating 12. FIG. 11 shows a cross section of an uncoated compressed biomass brick 10 on the left, and a coated one on the right, coated and encapsulated with a hardened coating material 12. Similarly, FIG. 12 shows a cross section of an uncoated log 10 on the left, and a coated log on the right, wherein the log is encapsulated by the hardened coating material 12. As shown, the coating 12 does not penetrate significantly into the compressed biomass product 10, and may not typically coat any of the compressed material substantially beyond the outside surface of each compressed biomass product 10.

Using the example method here, the coating 12 on each product may be less than about 0.010" thick, and may uniformly and completely cover and protect the product, so that they may be stored outside, for example. The hardened coating 12 forms a monolithic structure that evenly covers the product. Further, because the compressed biomass products 10 are heated to 190° F., 220° F., or above, living pests, fungus, etc. may be killed during the process and further prevented from infesting the processed compressed biomass products 10 due to the coating, being effectively sealed out. This not only helps preserve the compressed biomass product 10, but also prevents the transport of pests to different parts of the country when the products are shipped.

The coating process is useful even when compressed biomass products 10 are to be further packaged in bags, such as plastic bags. For example, if a plastic bag develops condensation on the inside due to weather and temperature conditions, uncoated products may become moldy, and the moisture intrusion may cause them to fall apart or crumble, whereas coated products 10 will be impervious to those problems.

Figure 15:
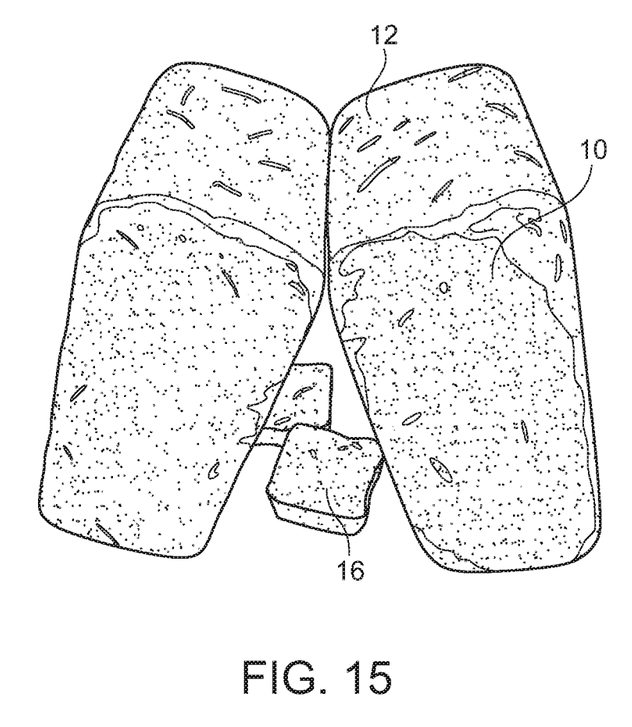
FIG. 15 is a perspective view of one shape of compressed biomass product produced by an example embodiment of a coating method for compressed biomass products in use.

FIG. 15 shows the final product, in brick form, in use. As shown, two bricks 10, with coating 12, are placed to form a pyramid over a fire starting product 16. The coating material 14 may be food-grade paraffin, so that the coated products are safe for cooking over.

E. Operation of an Alternate Embodiment

As shown in FIG. 6, the system can be arranged so that compressed biomass product 10 is sprayed rather than immersed in a liquid coating material 14. As shown, multiple tubes or pipes 50 carry the heated, liquefied coating material 14 to one or more spray nozzles 52, arranged to spray and evenly coat all sides of each compressed biomass product 10 as it passes through a coating area on a conveyor. In this embodiment, the conveyor 20 may be substantially level, since it is not necessary for it to carry products down into a liquid bath as with other example embodiments.

Figure 9:
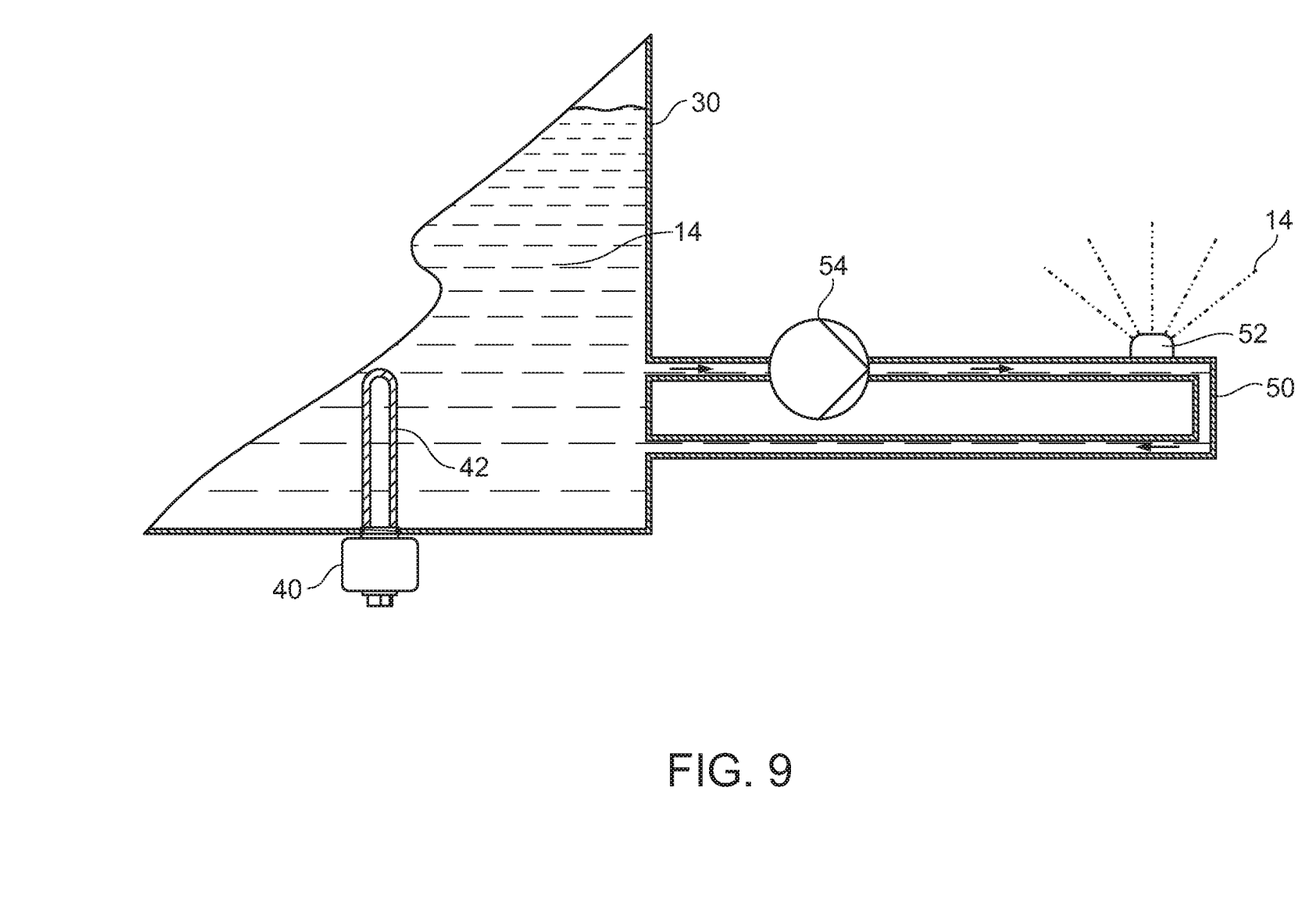
FIG. 9 a schematic diagram of a tank, heater, and pump for use with a coating method for compressed biomass products in accordance with another example embodiment.
Figure 10:
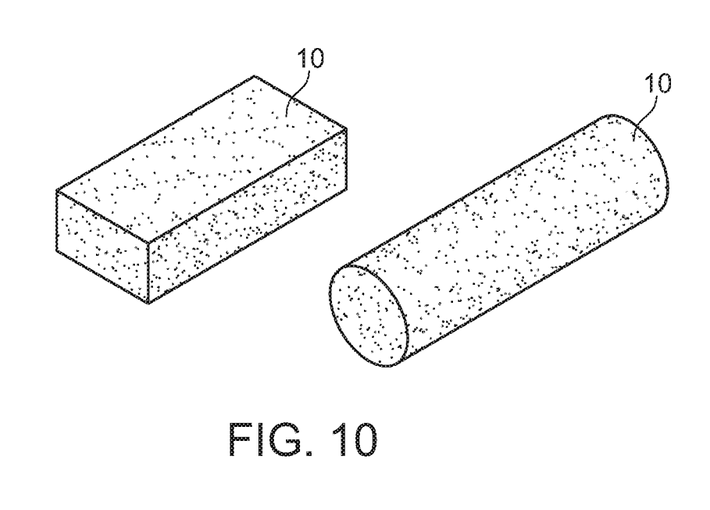
FIG. 10 is a perspective view of two possible shapes of compressed biomass products for use with a coating method for compressed biomass products in accordance with an example embodiment.

FIG. 9 illustrates this spray system in schematic form. A tank 30 is still used to heat the coating material 14, using a heater 40 with immersed heater elements 42. A pump 54 may be used to pump the liquefied coating material through tubes 50 to nozzles 52, which then spray liquid coating material 14 onto the compressed biomass products 10 as shown in FIG. 6.

Unless otherwise defined, all technical and scientific terms used herein have the same meaning as commonly understood by one of ordinary skill in the art to which this invention belongs. Although methods and materials similar to or equivalent to those described herein can be used in the practice or testing of the coating Method for compressed biomass products, suitable methods and materials are described above. All publications, patent applications, patents, and other references mentioned herein are incorporated by reference in their entirety to the extent allowed by applicable law and regulations. The coating Method for compressed biomass products may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for coating a compressed biomass product, comprising:
   heating a coating material in a tank to a temperature above its melting point, so that it is in a liquid state, the coating material having a depth and a surface;
   providing a conveyor for moving the compressed biomass product into the tank, the conveyor having a first end, a second end, a central portion, a conveyor surface, and a plurality of irregularities that extend above the conveyor surface, the first end and the second end of the conveyor being beyond the liquid surface and the central portion of the conveyor being in the coating material and the conveyor surface of the central portion being lower than the liquid surface by a distance greater than a thickness of the compressed biomass product;
   activating the conveyor so that the conveyor surface moves in a direction from the first end toward the second end;
   placing the compressed biomass product onto the conveyor proximate the first end such that a back edge of the compressed biomass product can engage one of the plurality of irregularities as the conveyor surface moves in the direction from the first end toward the second end;
   conveying the compressed biomass product into the coating material proximate the central portion of the conveyor so that the compressed biomass product is immersed in the coating material; and
   conveying the compressed biomass product out of the coating material proximate the second end of the conveyor.

2. The method for coating a compressed biomass product of claim 1, wherein the coating material comprises a wax.

3. The method for coating a compressed biomass product of claim 2, wherein the wax comprises paraffin wax.

4. The method for coating a compressed biomass product of claim 2, wherein the melting point of the wax is greater than about 130 degrees F.

5. The method for coating a compressed biomass product of claim 4, wherein the wax is heated to a controlled temperature above 190 degrees F.

6. The method for coating a compressed biomass product of claim 4, wherein the wax is heated to a controlled temperature above 215 degrees F.

7. The method for coating a compressed biomass product of claim 1, wherein the compressed biomass product is a log.

8. The method for coating a compressed biomass product of claim 1, wherein the compressed biomass product is a brick.

9. The method for coating a compressed biomass product of claim 1, wherein the conveyor is a chain conveyor.

10. The method for coating a compressed biomass product of claim 1, wherein the plurality of irregularities extend across the conveyor surface in a direction transverse to the direction from the first end toward the second end.

11. The method for coating a compressed biomass product of claim 10, wherein the some irregularities of the plurality of irregularities are spaced apart from each other in the direction from the first end toward the second end.

12. The method for coating a compressed biomass product of claim 10, wherein the coating material comprises a wax that hardens and comprises a monolithic structure coating the compressed biomass product.

13. The method for coating a compressed biomass product of claim 12, wherein the melting point of the wax is greater than about 130 degrees F.

14. The method for coating a compressed biomass product of claim 12, wherein the wax is heated to a controlled temperature above 190 degrees F.

15. The method for coating a compressed biomass product of claim 12, wherein the wax is heated to a controlled temperature above 215 degrees F.

16. The method for coating a compressed biomass product of claim 1, wherein the conveyor comprises a roller mounted to hold the conveyor surface down near the central portion such that the roller creates a slope into the tank and such that the conveyor surface is below the surface of the coating material.

17. The method for coating a compressed biomass product of claim 16, wherein the roller maintains tension on the conveyor.

18. The method for coating a compressed biomass product of claim 1, wherein the conveyor comprises a chain conveyor comprising wires, and wherein the plurality of irregularities comprise bends in the wires.

19. A method for coating a compressed biomass product, comprising:
- heating a coating material in a tank to a temperature above its melting point, so that it is in a liquid state, the coating material having a depth and a surface;
- providing a conveyor for moving the compressed biomass product into the tank, the conveyor having a first end, a second end, a central portion, a conveyor surface, the first end and the second end of the conveyor being beyond the liquid surface and the central portion of the conveyor being in the coating material and the conveyor surface of the central portion being lower than the liquid surface by a distance greater than a thickness of the compressed biomass product;
- activating the conveyor so that the conveyor surface moves in a direction from the first end toward the second end such that the conveyor surface passes under a single roller in the central portion, the single roller maintaining tension on the conveyor and creating a first slope of the conveyor surface from the first end to the central portion, and creating a second slope of the conveyor surface from the central portion to the second end;
- placing the compressed biomass product onto the conveyor proximate the first end;
- conveying the compressed biomass product into the coating material proximate the central portion of the conveyor so that the compressed biomass product is immersed in the coating material where the conveyor surface passes under the single roller; and
- conveying the compressed biomass product out of the coating material proximate the second end of the conveyor.

20. A method for coating a compressed biomass product, comprising:
- heating a coating material in a tank to a temperature above its melting point, so that it is in a liquid state, the coating material having a depth and a surface;
- providing a chain conveyor comprising wires for moving the compressed biomass product into the tank, the conveyor having a first end, a second end, a central portion, a conveyor surface, and a plurality of irregularities comprising bends in the wires that extend above the conveyor surface in a direction transverse to a direction from the first end toward the second end, the plurality of irregularities being spaced apart from each other in the direction from the first end toward the second end, the first end and the second end of the conveyor being beyond the liquid surface and the central portion of the conveyor being in the coating material and the conveyor surface of the central portion being lower than the liquid surface by a distance greater than a thickness of the compressed biomass product;
- activating the conveyor so that the conveyor surface moves in the direction from the first end toward the second end such that the conveyor surface passes under a roller in the central portion;
- placing the compressed biomass product onto the conveyor proximate the first end such that a back edge of the compressed biomass product can engage one of the plurality of irregularities as the conveyor surface moves in the direction from the first end toward the second end;
- conveying the compressed biomass product into the coating material proximate the central portion of the conveyor so that the compressed biomass product is immersed in the coating material where the conveyor surface passes under the roller; and
- conveying the compressed biomass product out of the coating material proximate the second end of the conveyor.

* * * * *